US012547997B2

(12) United States Patent
Isgar

(10) Patent No.: US 12,547,997 B2
(45) Date of Patent: *Feb. 10, 2026

(54) PAYMENT SYSTEM WITH AI FUNCTION

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/736,935

(22) Filed: Jun. 7, 2024

(65) Prior Publication Data
US 2024/0320640 A1 Sep. 26, 2024

Related U.S. Application Data

(63) Continuation of application No. 17/072,447, filed on Oct. 16, 2020, now Pat. No. 12,008,528, which is a continuation-in-part of application No. 16/664,763, filed on Oct. 25, 2019, now Pat. No. 11,157,971, which is a continuation-in-part of application No. 15/996,368, filed on Jun. 1, 2018, now Pat. No. 10,504,160.

(51) Int. Cl.
G06Q 20/10 (2012.01)
G06Q 20/32 (2012.01)
G06Q 30/0279 (2023.01)

(52) U.S. Cl.
CPC ....... *G06Q 20/102* (2013.01); *G06Q 20/3278* (2013.01); *G06Q 30/0279* (2013.01)

(58) Field of Classification Search
None
See application file for complete search history.

(56) References Cited

U.S. PATENT DOCUMENTS

| 6,092,052 | A | 7/2000 | Ziarno |
| 8,018,329 | B2 | 9/2011 | Morgan et al. |
| 8,653,956 | B2 | 2/2014 | Berkobin et al. |
| 9,191,217 | B2 | 11/2015 | Martell |
| 9,437,085 | B1 | 9/2016 | Rempe et al. |

(Continued)

FOREIGN PATENT DOCUMENTS

| EP | 3035265 | 6/2016 |
| WO | 2016049745 | 4/2016 |

OTHER PUBLICATIONS

"NCR and Krispey Kreme Digitize the Salvation Army's Red Kettle Christmas Campaign via Mobile App." Press Release/Investor Relations/NCR Sep. 28, 2018.

(Continued)

*Primary Examiner* — Dennis W Ruhl
(74) *Attorney, Agent, or Firm* — Schmeiser, Olsen & Watts LLP

(57) ABSTRACT

A charitable payment system is provided for use in boundary-less commerce. The system includes a computer server having a memory storing charitable organization or other organization data and user data and a user computing device coupled to the computer server. The system establishes a proximity zone around a business area. When a user computing device enters the proximity zone, a connection between the server and the user computing device is established. The computer server may be programmed to receive from the user computing device a signal activating a payment, the signal including user data and payment data, including user identifying information and a payment amount. The computer server may be programmed to process the payment and account for the payment amount.

5 Claims, 14 Drawing Sheets

(56) References Cited

U.S. PATENT DOCUMENTS

| | | |
|---|---|---|
| 9,710,821 B2 | 7/2017 | Heath |
| 10,504,160 B1 | 12/2019 | Isgar |
| 2004/0122682 A1 | 6/2004 | Gruber et al. |
| 2006/0026056 A1 | 2/2006 | Weiner et al. |
| 2006/0167765 A1 | 7/2006 | Lacey et al. |
| 2009/0181131 A1 | 7/2009 | Forbes-Roberts |
| 2010/0010886 A1 | 1/2010 | Flynn, Jr. |
| 2010/0010921 A1 | 1/2010 | Liu et al. |
| 2011/0295988 A1 | 12/2011 | Le |
| 2012/0078762 A1 | 3/2012 | Valin et al. |
| 2012/0254032 A1 | 10/2012 | Carbonell |
| 2013/0018705 A1 | 1/2013 | Heath et al. |
| 2013/0254107 A1 | 9/2013 | McClure |
| 2013/0268440 A1 | 10/2013 | Tierney et al. |
| 2014/0188726 A1 | 7/2014 | Vasantham et al. |
| 2014/0235166 A1 | 8/2014 | Molettiere et al. |
| 2014/0304187 A1 | 10/2014 | Menn |
| 2014/0310193 A1 | 10/2014 | Olliphant et al. |
| 2015/0019432 A1 | 1/2015 | Burns |
| 2015/0120553 A1 | 4/2015 | Li |
| 2015/0142688 A1 | 5/2015 | Jackson et al. |
| 2015/0154667 A1 | 6/2015 | Hicks et al. |
| 2016/0088449 A1 | 3/2016 | Sharma |
| 2016/0098696 A1 | 4/2016 | Sundaram |
| 2016/0247144 A1 | 8/2016 | Oh et al. |
| 2016/0323812 A1 | 11/2016 | Moon |
| 2016/0328692 A1 | 11/2016 | Camps et al. |
| 2016/0349984 A1 | 12/2016 | Ding |
| 2017/0032354 A1 | 2/2017 | Tilahun |
| 2017/0098210 A1 | 4/2017 | Laracey et al. |
| 2018/0181928 A1 | 6/2018 | Woo |
| 2018/0276764 A1 | 9/2018 | Acosta et al. |
| 2021/0166279 A1 | 6/2021 | Louw et al. |

OTHER PUBLICATIONS

"Recent Advances In Wireless Indoor Localization Techniques and System" Journal of Computer Networks and Communications vol. 2013 (2013), Article ID 185138, 12 pages.

"Salvation Army Ponders Cashless Kettle as Digital Donations Increase." Chicago Tribune Dec. 19, 2017.

Isgar, Charles, Charity Donation System, Patent Cooperation Treaty Application Serial No. PCT/US19/35253, Filed Jun. 3, 2019, International Search Report and Written Opinion dated Aug. 16, 2019.

Isgar, Charles, Charity Donation and Payment Systems, Patent Cooperation Treaty Application Serial No. PCT/US2020/057341, filed Oct. 26, 2020, International Search Report and Written Opinion dated Jan. 28, 2021.

Isgar, Charles, Charity Donation and Payment Systems, European Application Serial No. EP19810729, filed Jun. 3, 2019, Extended European Search Report dated Jul. 8, 2021.

Isgar, Charles, Charity Donation and Payment Systems, Australian Application Serial No. 2019279098 filed Jun. 3, 2019, First Examination Report dated Nov. 30, 2021.

PAYMENT SYSTEM WITH AI FUNCTION

CROSS REFERENCE TO RELATED APPLICATION[S]

This application is a continuation of the earlier U.S. Utility patent application Ser. No. 17/072,447, filed Oct. 16, 2020, which is a continuation-in-part of the earlier U.S. Utility patent application Ser. No. 16/664,763, filed Oct. 25, 2019, now U.S. Pat. No. 11,157,971, issued Oct. 26, 2021, which is a continuation-in-part of the earlier U.S. Utility patent application Ser. No. 15/996,368, filed Jun. 1, 2018, now U.S. Pat. No. 10,504,160, issued Dec. 10, 2019, the disclosures of which are hereby incorporated entirely herein by reference.

BACKGROUND OF THE INVENTION

Technical Field

This invention relates generally to a charitable contribution system, and more particularly to a system for providing electronic payments for charitable and other purposes in boundary-less commerce.

State of the Art

Charitable organizations historically have various ways of collecting donations. For example, one way is to have an employee or volunteer collecting cash and coins operating a collection container inside or outside of a business, like a grocery store, department store and the like. In these instances, people with spare change or cash can deposit money into the container. This has significant drawbacks, such as theft of the donations, fewer donations as more and more people do not carry cash, lack of verification of the collection container really being associated with a charitable organization, and the like. Additionally, there are often charitable events and opportunities to purchase items from vendors or at an auction for charity. Further, changes in commerce that businesses, including charitable organizations, are facing as the traditional retail space is shifting from strictly brick-and-mortar to online sales or a hybrid of brick-and-mortar and online, mobile stores and restaurants like trucks and pop-ups, open space marketplaces like farmers markets and swap meets, and other forms of retail interactions are moving to a boundary-less commerce environment. There are not systems that allow for ease of purchase, particularly cashless purchases, with minimal to no contact that can be easily implemented in such boundary-less commerce.

Accordingly, there is a need for an improved system for charitable and other money transactions in boundary-less commerce.

DISCLOSURE OF THE INVENTION

The present invention relates to a payment system that allows for electronic payment for goods or services from a plurality of users in a boundary-less commerce environment.

An embodiment includes a charitable payment system comprising: a computer server having a memory storing charitable organization data of a charitable organization and user data of a user; and a user computing device coupled to the computer server, the computer server programmed to: automatically generate and establish a proximity zone around a business area; receive a first signal from the user computing device that the user computing device of the system has entered the proximity zone; automatically establish a connection between the server and the user computing device in response to the user computing device entering the proximity zone; automatically generate and send for display on the user computing device an order interface that includes at least one payment activation button; receive from the user computing device a second signal activating an order submission and a payment in response to selection of the at least one payment activation button on the user computing device, the second signal including user identifying information, payment amount and payment instrument initiating the payment amount; and automatically process the second signal and send a communication to the user computing device to acknowledge receipt of the payment amount.

Another embodiment includes an order and payment system comprising: a computer server having a memory storing organization data and user data; and a user computing device coupled to the computer server, the computer server programmed to: automatically generate and establish a proximity zone around the pay receipt device; receive a first signal from the user computing device that the user computing device of the system has entered the proximity zone; automatically establish a connection between the server and the user computing device in response to the user computing device entering the proximity zone; automatically generate and send for display on the user computing device an order interface that comprises at least one payment activation button; receive from the user computing device a second signal activating an order submission and a payment in response to selection of the at least one payment activation button on the user computing device, the second signal comprising user identifying information, payment amount and payment instrument initiating the payment amount; and automatically process the second signal and send a communication to the user computing device to acknowledge receipt of the payment amount.

An embodiment includes a charitable payment system comprising: a computer server having a memory storing charitable organization data of a charitable organization and user data; a pay receipt device coupled to the computer server; and a user computing device of a user coupled to the computer server, the computer server programmed to: receive from the pay receipt device a first signal that the pay receipt device is active and automatically generate and send for auto-execution instructions to establish a proximity zone around the pay receipt device; receive a second signal from the pay receipt device that a user computing device of the system has entered the proximity zone; automatically establish a connection between the server and the user computing device in response to the user computing device entering the proximity zone; automatically generate and send for display on the user computing device an order interface that includes at least one payment activation button; receive from the user computing device a third signal activating an order submission and a payment in response to selection of the at least one payment activation button on the user computing device, the third signal comprising user identifying information, payment amount and payment instrument initiating the payment amount; and automatically process the third signal and send a communication to the user computing device to acknowledge receipt of the payment amount.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a payment system that allows for electronic payment for goods or services from a plurality of users in a boundary-less commerce environment. Additionally, the invention relates to a system that provides an easy form of payment to verified charitable organizations without the use of cash. This is particularly relevant as the general population carries less cash and therefore has less cash to provide to charitable organizations at payment locations.

Figure 1:
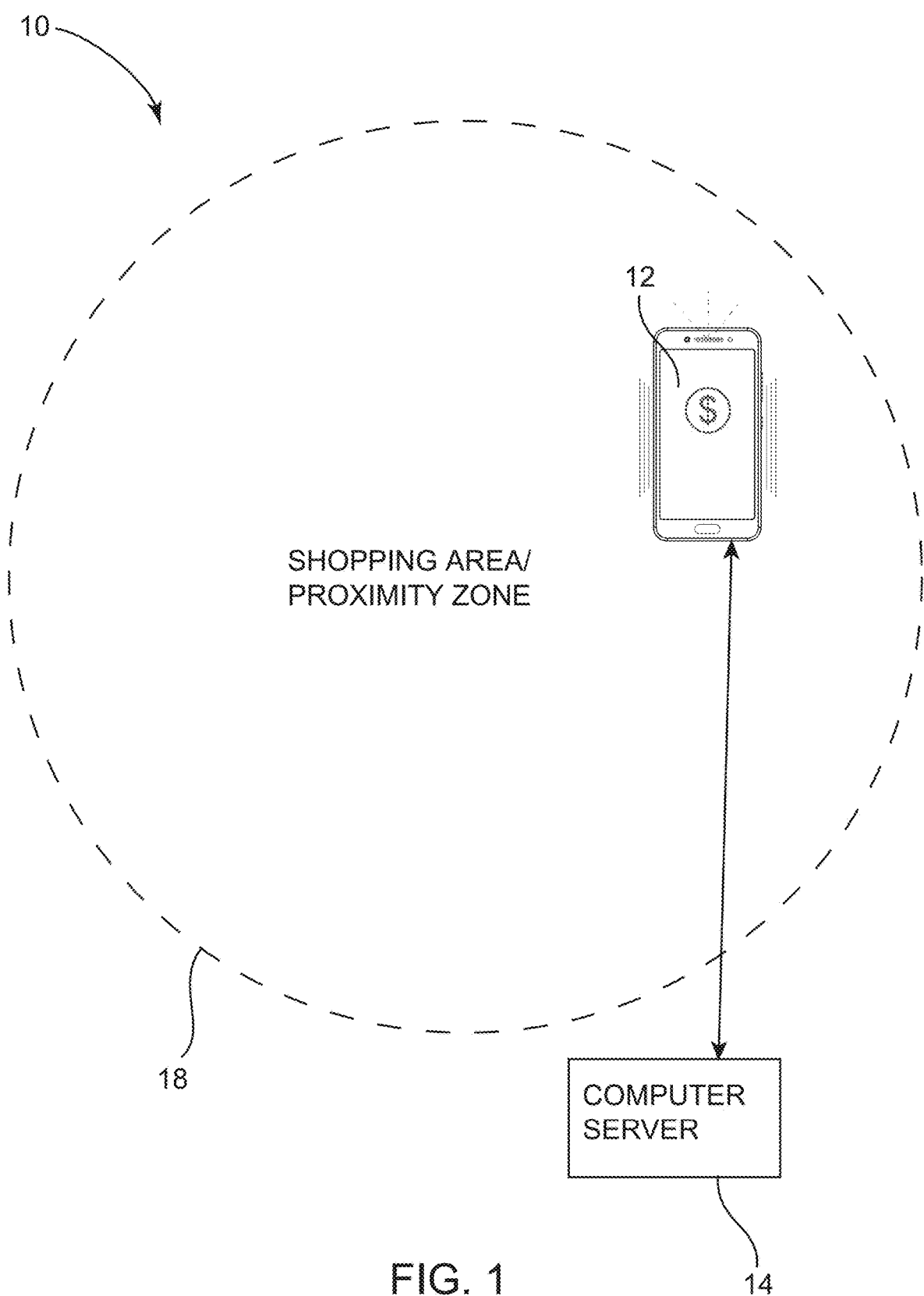
FIG. 1 is a diagrammatic view of a charity payment system in accordance with an embodiment.

Referring to the drawings, FIG. 1 depicts an embodiment of a charitable payment system 10. The system 10 may include user computing devices 12 and a computer server 14, wherein the user computing devices 12 is coupled to the computer server 14. This coupling may be a network connection, such as through an Internet connection, wherein the user computing devices 12 may communicate with and receive communication from the server 14.

The computer server 14 may include a memory storing charitable organization data corresponding to various charitable organizations and user data. The charitable organization data includes verification information that the charitable organizations are legitimate, display information, bank account information and the like. The user data may include name, contact information including address, email and phone number and payment account information for effecting a payment, and the like. A user computing device 12 may be coupled to the computer server 14, and, referring additionally to FIG. 2, the computer server 14 may be programmed to automatically generate and establish a proximity zone 18 around a business area (Step 20); receive a signal from a user computing device 12 that the user computing device 12 of the system has entered the proximity zone 18 (Step 21); automatically establish a connection between the server and the user computing device in response to the user computing device entering the proximity zone 18 (Step 22); automatically generate and send for display on the user computing device 12 an order interface that includes at least one payment activation button (Step 23); receive from the user computing device a signal activating a payment, the signal including user identifying information, a payment amount and a payment instrument initiating the payment amount (Step 24); and automatically process the signal and send a communication to the user computing device to acknowledge receipt of the payment amount (Step 25).

The proximity zone 18 may be a predetermined size, such as a radius or space around the pay receipt device. The size of the proximity zone 18 may be determined by the type of pay receipt device and the charitable organization employing the pay receipt device. The proximity zone 18 may include, but is not limited to a geofence, an NFC zone, a Wi-Fi signal quadrant, such as a 5G Wi-Fi signal quadrant, or any other means of establishing a proximity zone.

The computer server 14 may further be programmed to verify the charitable organization as legitimate and communicate the verification to the user computing device 12 in response to the user computing device accessing the system within the proximity zone 18. Further still, the computer server 14 may be programmed to verify or otherwise confirm that the proximity zone 18 is legitimately associated with the charitable organization. In some embodiments, the computer server 14 is further programmed to automatically verify the charitable organization as legitimate and communicate the verification to the user computing device 12 in response to the user computing device 12 entering the proximity zone 18. A charitable organization may register with the system 10, and the system may verify the charitable organization as legitimate and store the verification in memory on the server. When the charitable organization operates the system, the server 14 may store in its memory an identification of one or more proximity zones 18 that is/are assigned to the charitable organization. Accordingly, the computer server 14 may be programmed to access its memory to determine or verify if the charitable organization associated with the proximity zone(s) 18 is legitimate and to verify that the proximity zone 18 is legitimately associated with the charitable organization, wherein the server 14 assigns an identification of the proximity zone(s) 18 and confirms that the identification of the proximity zone(s) 18 entered by the user computing device 12 is assigned to the charitable organization. In at least this way, there is a two-step verification of verifying the charitable organization as legitimate and verifying that the proximity zone 18 is associated or assigned to that legitimate charitable organization. It will be understood that in some embodiments, other organizations, such as, but not limited to, a business, a sole proprietor or the like may operate in a similar manner as described herein with regard to the charitable organization.

The computer server may then be programmed to transfer payments to a bank account of the charitable organization. The system may retain a predetermined amount from the total payment amount as a cost for processing the payments and for utilization of the system. This may be automated upon deactivation of the pay receipt device.

Additionally, the computer server 14 may be programmed to automatically account for the payments made utilizing the system 10 by the same user through a user computing device 12. The computer server 14 may be programmed to automatically store in its memory, payment information associated with the user, wherein the payment information may include the charitable organization, the amount of the payment, and the date of the payment. The computer server 14 may be programmed to automatically generate tax documentation of all charitable payments made by the user over a calendar year itemized by charitable organization amount and dates of payments to be used by the user in preparing tax returns.

Figure 3:
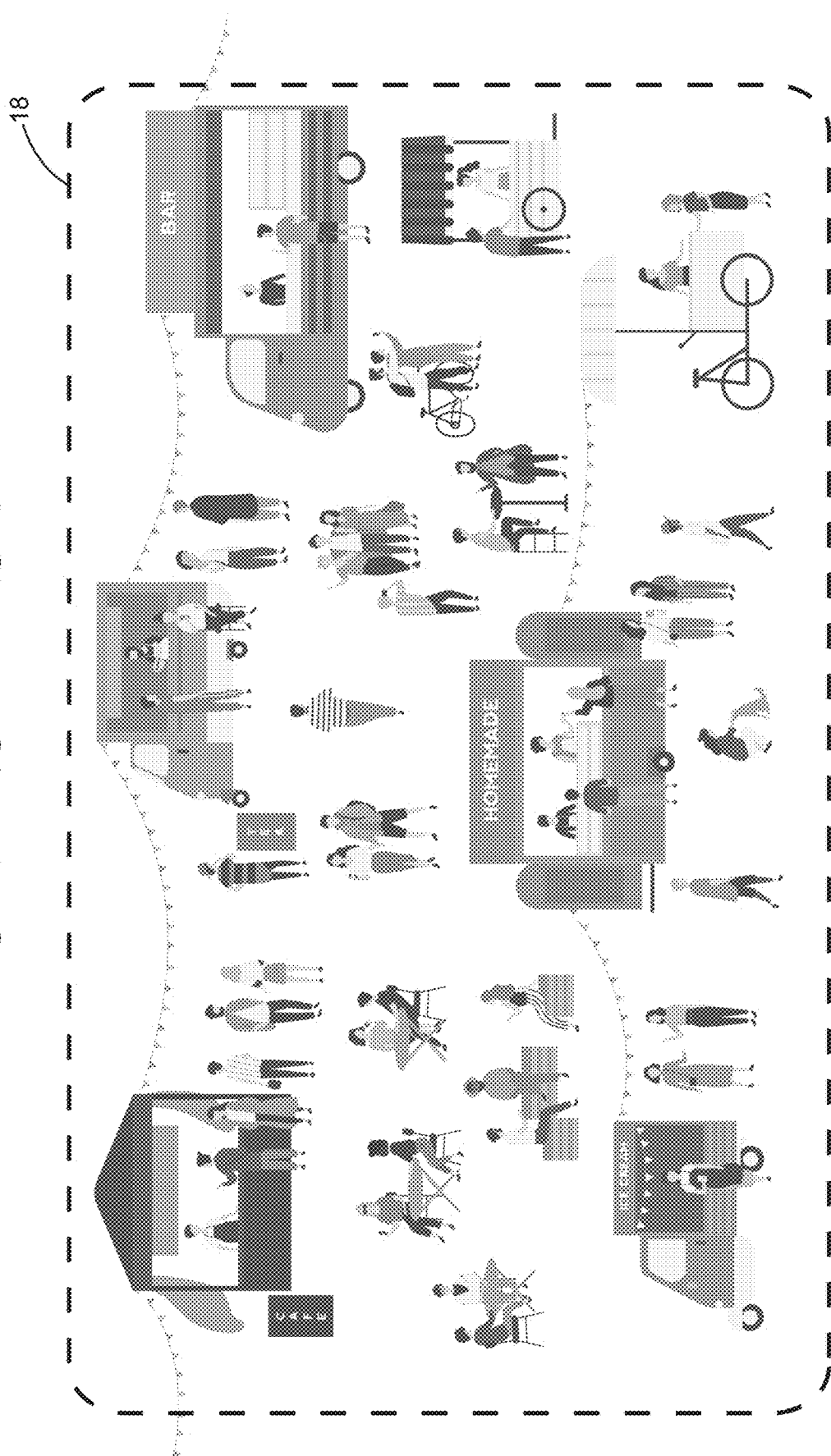
FIG. 3 is a view of charity festival utilizing a charity payment system in accordance with an embodiment.
Figure 4:
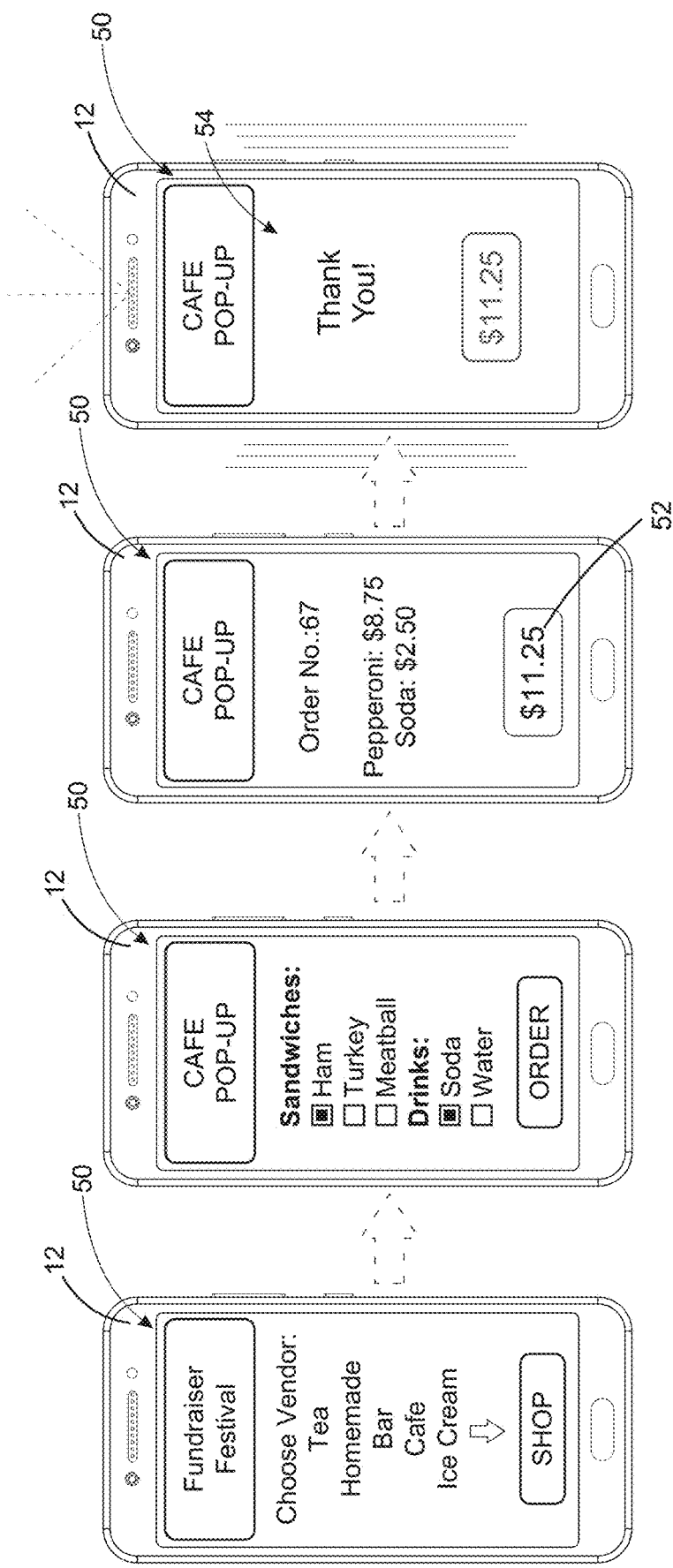
FIG. 4 is a view of a mobile computing device operating as part of the charity payment system of FIG. 3 in accordance with an embodiment.

There are various examples of businesses operating in boundary-less commerce as shown in FIGS. 3-11. Referring to the drawings, FIGS. 3 and 4 depict an activation of a payment in accordance with an embodiment. In embodiments, as the mobile computing device 12 enters the proximity zone 18 around a charitable event, such as a fundraiser festival, wherein the server 14 has established the proximity zone 18, the server 14 may be programmed to automatically generate and send for display on the user computing device 12 an order interface 50 that includes a list of vendors that is part of the system. The order interface 50 may be engaged by a user within the proximity zone. For example, a user may pass through the proximity zone and receive the order interface 50 on the user computing device 12. The user may then select a vendor, such as a Café, and select a shop button. The order interface may then provide a menu for the selected vendor wherein the user may select on the user computing device 12 the items he or she wishes to order and select the order button. The order interface 50 then depicts the order, including the amount owed for the order, the order interface having at least one payment activation button 52. The activation button 52 may include the amount due for the order. The server 14 may be programmed to receive from the user computing device 12 a signal activating a payment in response to selection of the at least one payment activation button 52 on the user computing device 12. The signal may include user data and payment data, including a user identifying information and a payment amount. The server 14 may further be programmed to automatically process the signal and send a communication to the user computing device to acknowledge receipt of the payment amount, such as a confirmation interface 54 shown in FIG. 4 that may also include an audible, a visual and/or a tactile confirmation of the payment.

Figure 5:
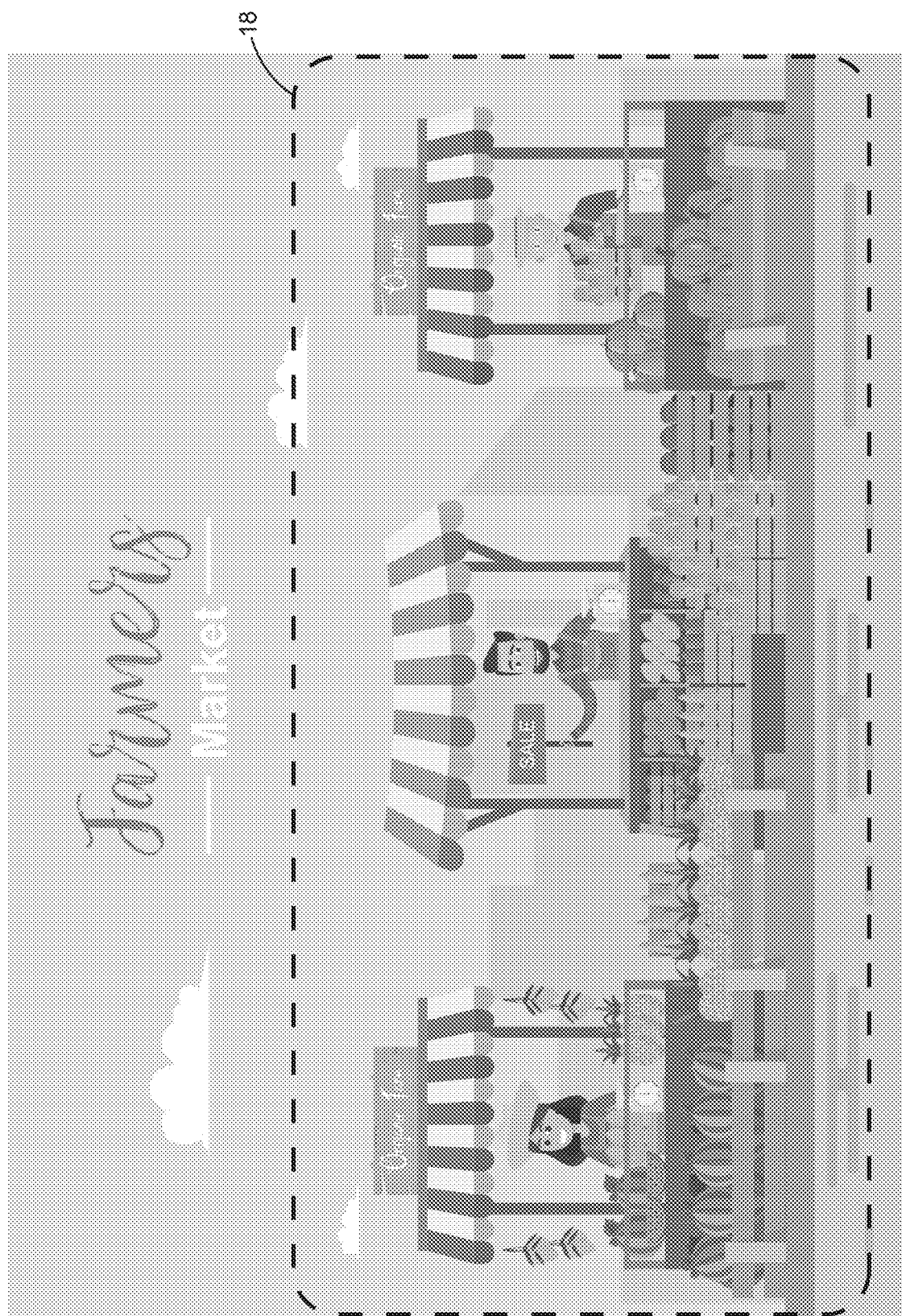
FIG. 5 is a view of farmers market utilizing an order and payment system in accordance with an embodiment.
Figure 6:
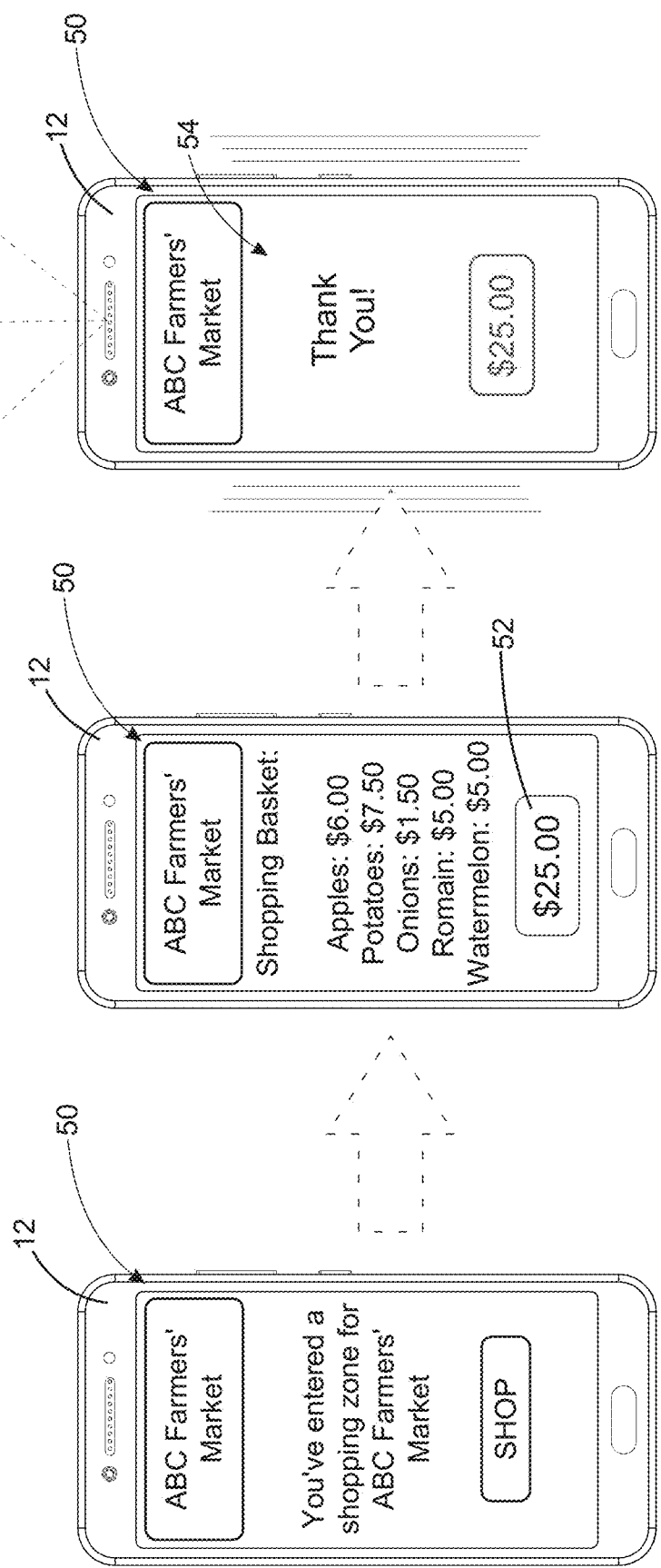
FIG. 6 is a view of a mobile computing device operating as part of the order and payment system of FIG. 5 in accordance with an embodiment.

Referring again to the drawings, FIGS. 5 and 6 depict an activation of a payment in accordance with an embodiment. In embodiments, as the mobile computing device 12 enters the proximity zone 18 around an organization, such as a farmers market, wherein the server 14 has established the proximity zone 18, the server 14 may be programmed to automatically generate and send for display on the user computing device 12 an order interface 50. The order interface 50 may be engaged by a user within the proximity zone. For example, a user may pass through the proximity zone and receive the order interface 50 on the user computing device 12. The user may then select a shop button. The order interface 50 may then provide a virtual shopping basket to account for the products the user is purchasing for the selected vendor wherein the user may select on the user computing device 12 the items he or she wishes to order. The order interface 50 may also include the amount owed for the order that is adjusted as items are added o removed from the shopping basket, the order interface having at least one payment activation button 52. The activation button 52 may include the amount due for the order. The server 14 may be programmed to receive from the user computing device 12 a signal activating a payment in response to selection of the at least one payment activation button 52 on the user computing device 12. The signal may include user data and payment data, including a user identifying information and a payment amount. The server 14 may further be programmed to automatically process the signal and send a communication to the user computing device to acknowledge receipt of the payment amount, such as a confirmation interface 54 shown in FIG. 6 that may also include an audible, a visual and/or a tactile confirmation of the payment. This system may be similarly used for a grocery store, such as the grocery store depicted in FIG. 9.

Figure 7:
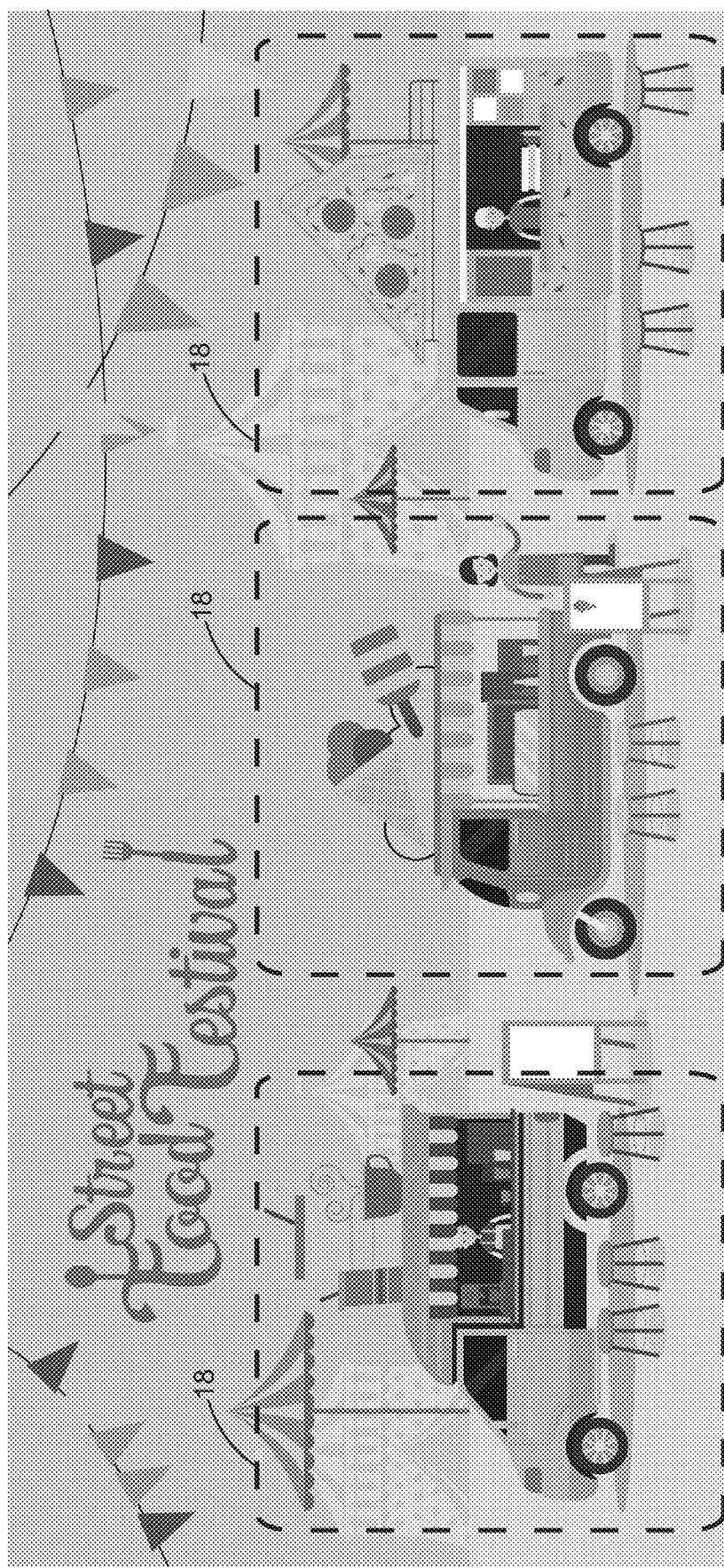
FIG. 7 is a view of food truck festival utilizing an order and payment system in accordance with an embodiment.
Figure 8:
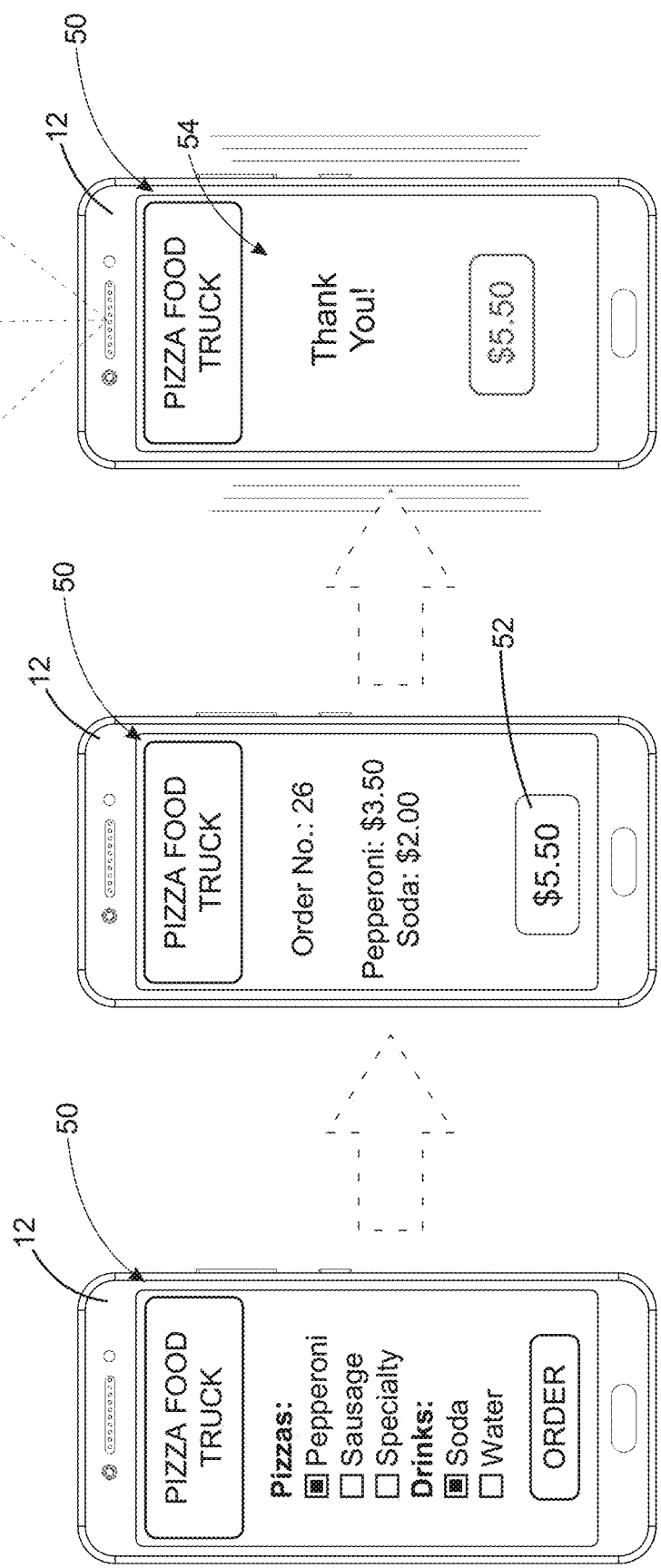
FIG. 8 is a view of a mobile computing device operating as part of the order and payment system of FIG. 8 in accordance with an embodiment.
Figure 9:
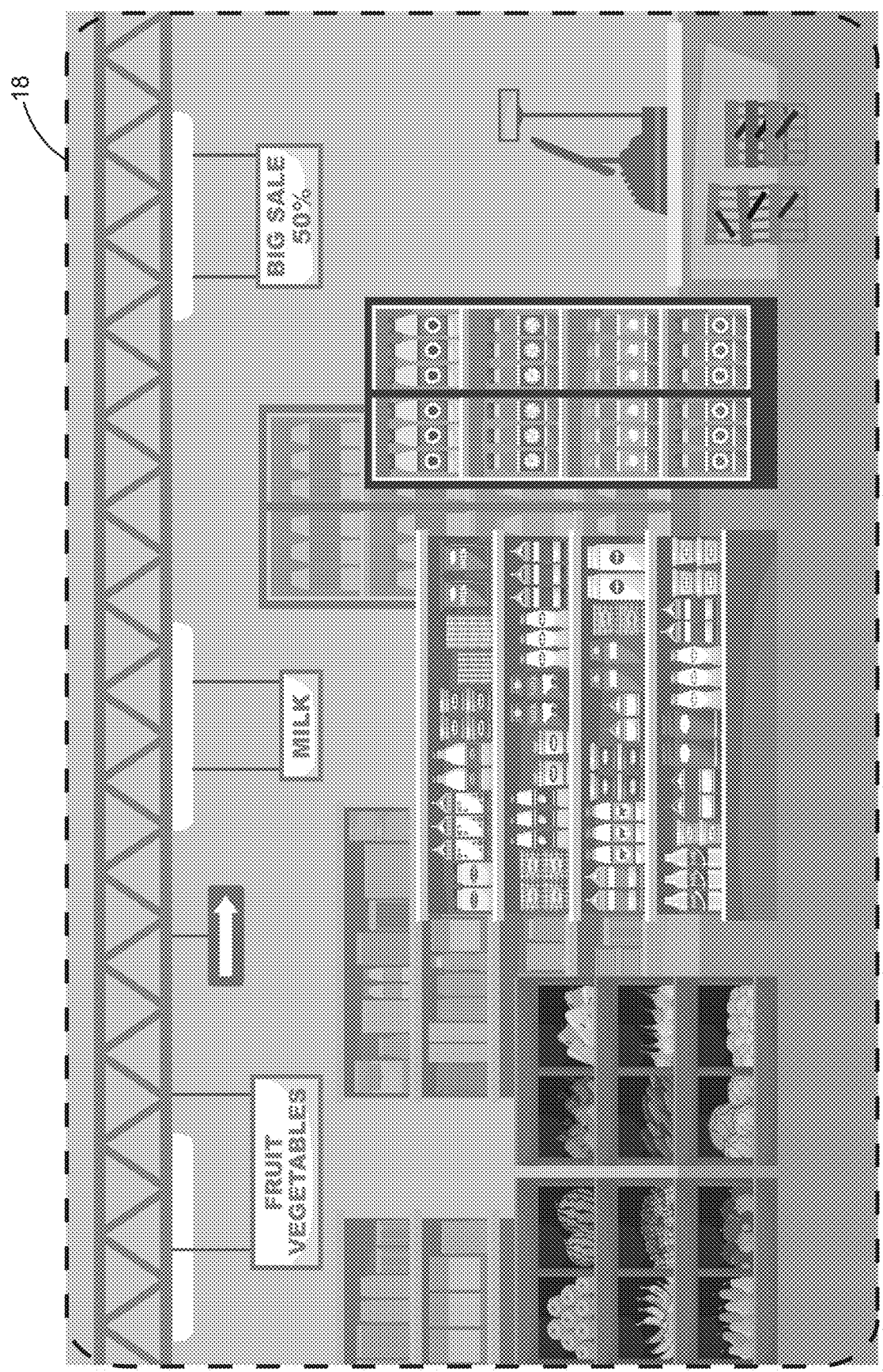
FIG. 9 is a view of grocery store utilizing an order and payment system in accordance with an embodiment.

Referring again to the drawings, FIGS. 7 and 8 depict an activation of a payment in accordance with an embodiment. In embodiments, as the mobile computing device 12 enters the proximity zone 18 around an organization, such as each food truck at a food truck festival as depicted in FIG. 7, wherein each food truck comprises a server 14 that established the proximity zone 18 around each truck, the server 14 may be programmed to automatically generate and send for display on the user computing device 12 an order interface 50. The order interface 50 may be engaged by a user within one of the proximity zones 18. For example, a user may pass through the proximity zone 18 associated with the pizza food truck and receive the order interface 50 on the user computing device 12. The order interface may then provide a menu for the pizza food truck wherein the user may select on the user computing device 12 the items he or she wishes to order and select the order button. The order interface 50 then depicts the order, including the amount owed for the order, the order interface having at least one payment activation button 52. The activation button 52 may include the amount due for the order. The server 14 may be programmed to receive from the user computing device 12 a signal activating a payment in response to selection of the at least one payment activation button 52 on the user computing device 12. The signal may include user data and payment data, including a user identifying information and a payment amount. The server 14 may further be programmed to automatically process the signal and send a communication to the user computing device to acknowledge receipt of the payment amount, such as a confirmation interface 54 shown in FIG. 8 that may also include an audible, a visual and/or a tactile confirmation of the payment.

Figure 10:
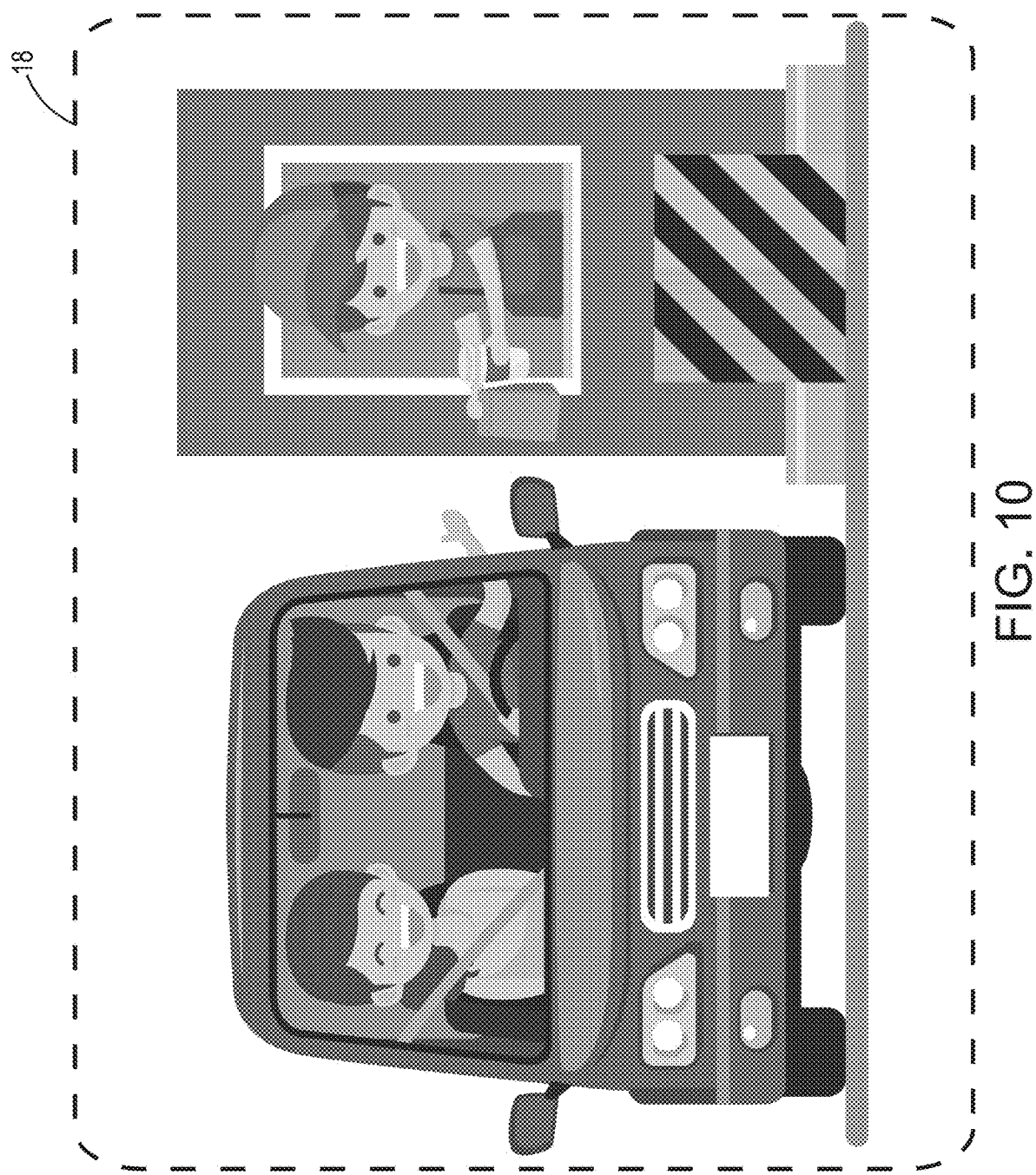
FIG. 10 is a view of restaurant drive thru utilizing an order and payment system in accordance with an embodiment.
Figure 11:
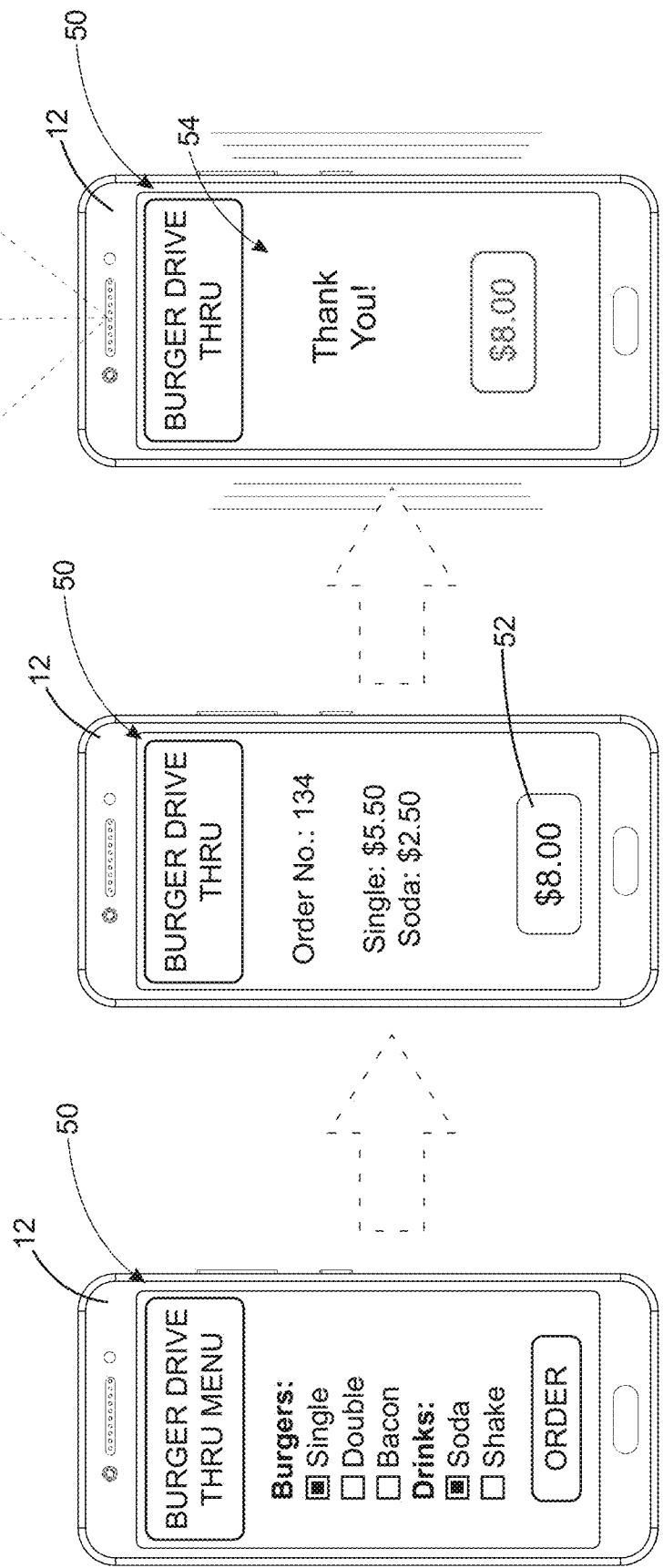
FIG. 11 is a view of a mobile computing device operating as part of the order and payment system of FIG. 10 in accordance with an embodiment.

Referring again to the drawings, FIGS. 10 and 11 depict an activation of a payment in accordance with an embodiment. In embodiments, as the mobile computing device 12 enters the proximity zone 18 around an organization, such as a fast-food drive thru as depicted in FIG. 10, wherein a server 14 that established the proximity zone 18 around each truck, the server 14 may be programmed to automatically generate and send for display on the user computing device 12 an order interface 50. The order interface 50 may be engaged by a user within one of the proximity zones 18. For example, a user may pass through the proximity zone 18 associated with the drive thru and receive the order interface 50 on the user computing device 12. The order interface may then provide a menu for the fast-food drive thru wherein the user may select on the user computing device 12 the items he or she wishes to order and select the order button. The order interface 50 then depicts the order, including the amount owed for the order, the order interface having at least one payment activation button 52. The activation button 52 may include the amount due for the order. The server 14 may be programmed to receive from the user computing device 12 a signal activating a payment in response to selection of the at least one payment activation button 52 on the user computing device 12. The signal may include user data and payment data, including a user identifying information and a payment amount. The server 14 may further be programmed to automatically process the signal and send a communication to the user computing device to acknowledge receipt of the payment amount, such as a confirmation interface 54 shown in FIG. 11 that may also include an audible, a visual and/or a tactile confirmation of the payment.

It is contemplated that in embodiments, the charitable organization or other business organizations utilizing the system 10 may have a business computing device (not shown) that may be coupled to the server 14. The business computing device may be utilized by the charitable organization or business to update content provided from the charitable organization or business. For example, and without limitation, the business computing device may send updated information regarding inventory, pricing, sales, availability, or the like. This updated content may be pushed to user computing devices 12 that are within the proximity zone 18 associated with that charitable organization or business. These are just examples of the information that may be updated by the implementation of a business computing device into the system 10.

In embodiments, the payment data sent by the user computing device 12 to the server 14 in response to selecting the activation button 52 may include a payment amount associated with the activation button requiring confirmation prior to processing the payment amount. The server 14 may further be programmed to send verification instructions to the user computing device in response to receiving and processing the payment data. The verification instructions may be a text message, an email, a user interface displayed on the user computing device or the like. The verification instructions may provide instructions, a link, a button or other form of sending a verification of the payment amount. The verification may include verifying that the user intended to pay the amount and the charitable organization to which the user intended to pay. Additionally, the server 14 is further programmed to initiate payment of the payment amount utilizing a payment instrument stored in the user data corresponding to the user identifying information, in response to receiving verification of the pledged payment amount.

It should be appreciated that the system 10 operates in a manner that keeps the user information anonymous from the charities or organizations that utilize the system 10. The system 10 may be operated by a third party, wherein charities or businesses register for use of the system 10 and the information of the charities or businesses are stored on the system. As a user with user computing device 12 may move from proximity zone to proximity zone and the system 10 can send the alert to the user computing device 12 in a one directional push of information to the user computing device 12, either to the device itself or through the application operating the system. This does not need to include the sharing of user information with charity or business or tracking of location by the charity or business. In some embodiments, the system 10 may not ever need to share the user's information with the charity or business and the user can still receive the tax benefit based on documentation provided from the system 10. The system operating in at least this way provides places the movement from anonymous to engaging with the charity in the hands of the user and not a byproduct of utilizing the system.

Figure 12A:
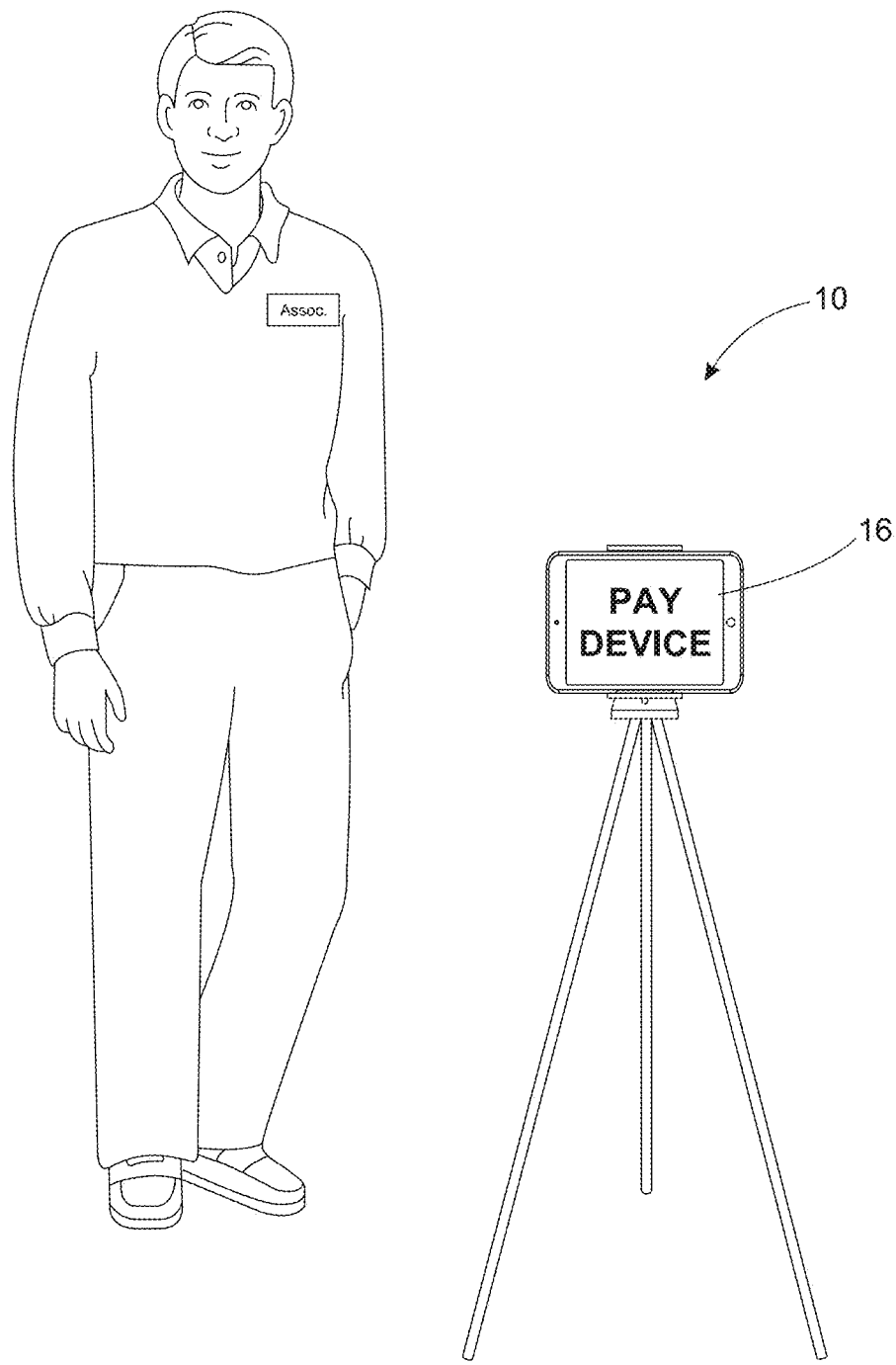
FIG. 12A is a view of a charity payment system in accordance with an embodiment.
Figure 12B:
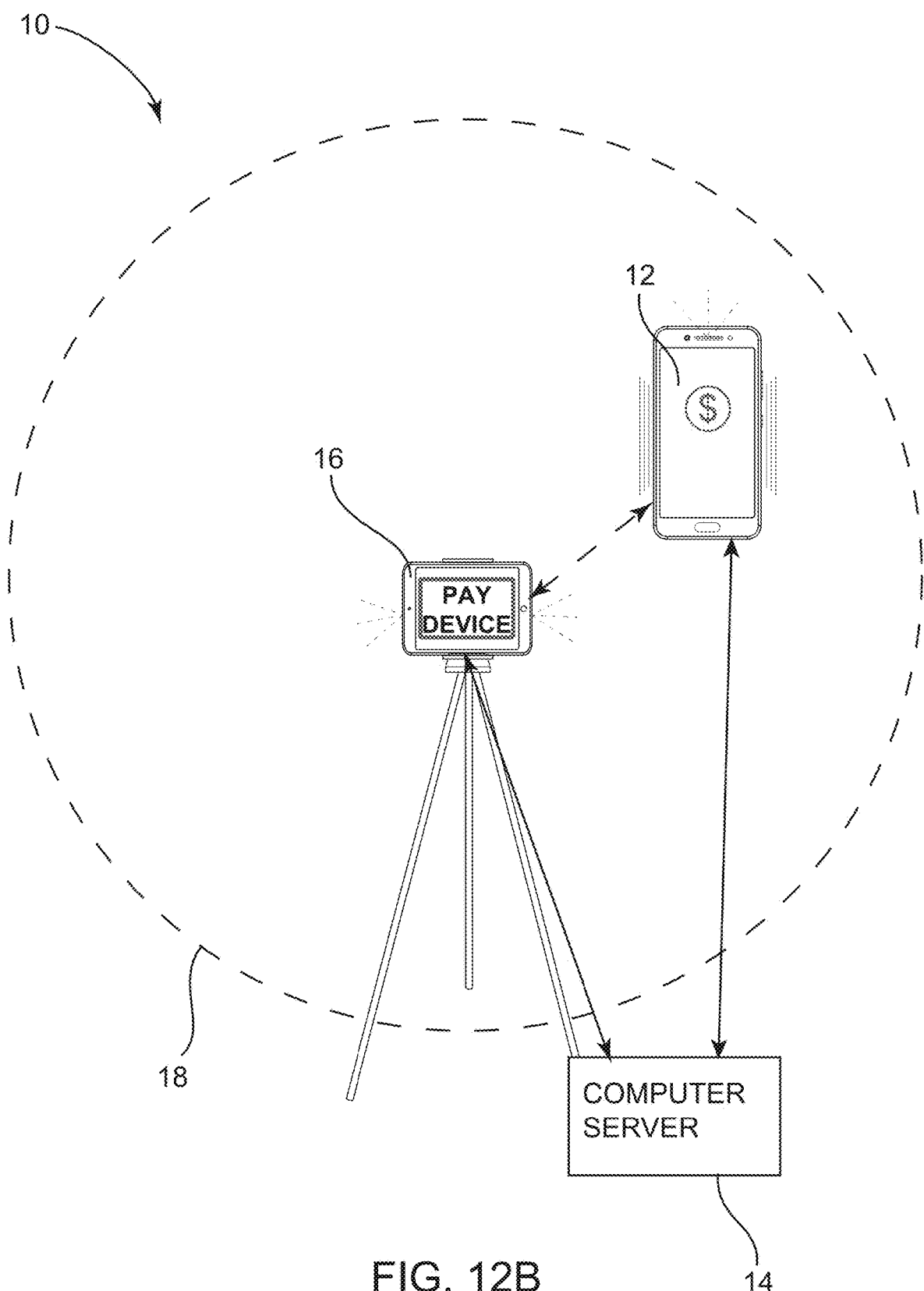
FIG. 12B is a diagrammatic view of a charity payment system in accordance with an embodiment.
Figure 13:
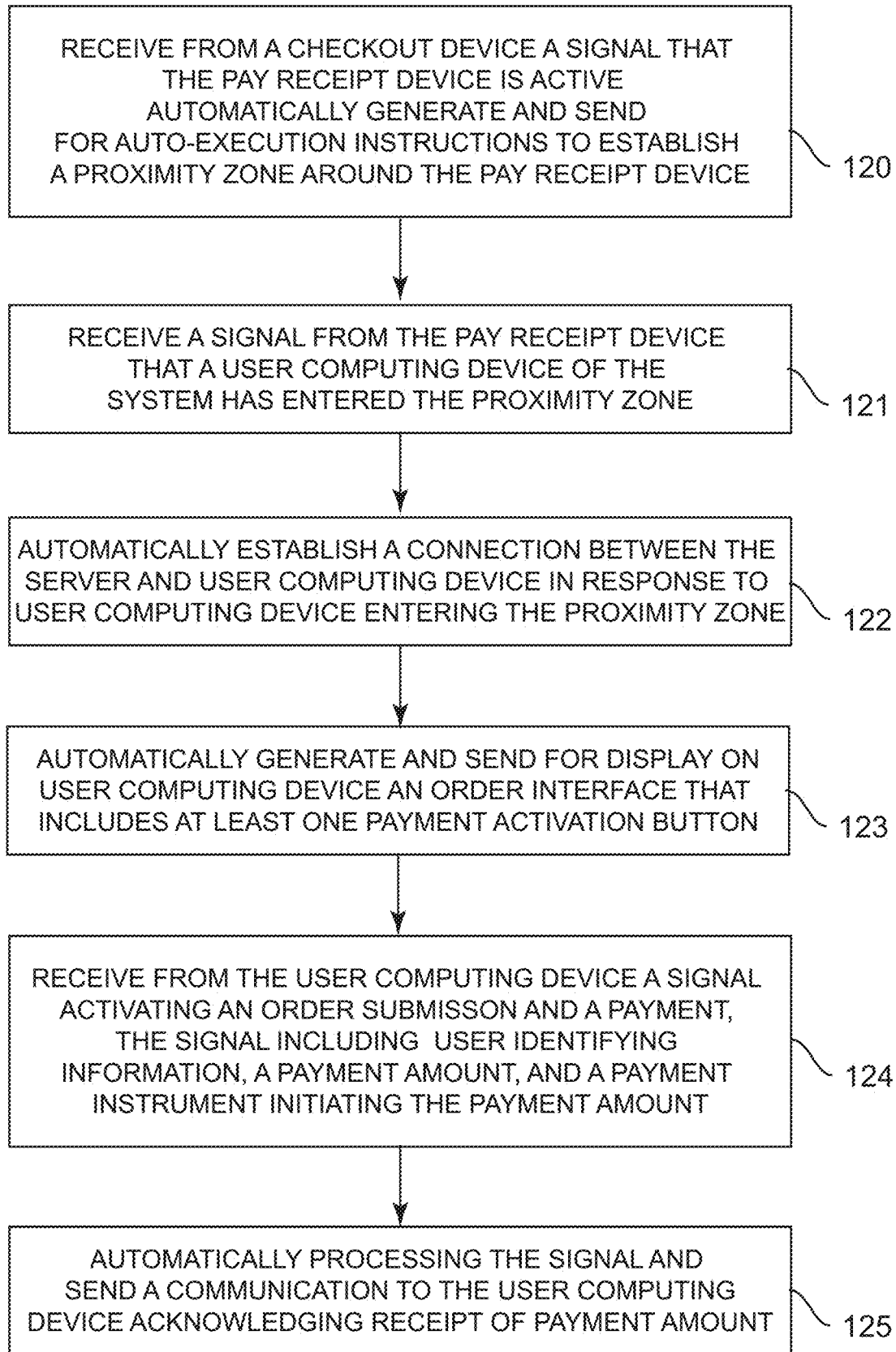
FIG. 13 is a flow chart of programmed steps of a computer server of a charity payment system in accordance with an embodiment.

Another embodiment of the present invention, as depicted in FIGS. 12A-13, wherein the charitable payment system 10 also includes a pay receipt device 16. In these embodiments, the system 10 may include user computing devices 12, a computer server 14, and a pay receipt device 16, wherein the user computing devices 12 and the pay receipt device 16 are coupled to the computer server 14. This coupling may be a network connection, such as through an Internet connection, wherein the user computing devices 12 and the pay receipt device 16 may communicate with and receive communication from the server 14.

In embodiments, the pay receipt device 16 may be, without limitation, a smartphone or a tablet for electronic payments, a remote cashier station or a container with smart electronics or with a smartphone or a tablet coupled to a container for operation within the system while also allowing for cash and electronic payments. In embodiments where there is a tablet, smart phone or the like, the system 10 may include an application that operates on the device in order to communicate with the server 14. In these embodiments, activating the pay receipt device 16 may include operating the app on the tablet or smartphone.

The computer server 14 may include a memory storing charitable organization data corresponding to various charitable organizations and user data. The charitable organization data includes verification information that the charitable organizations are legitimate, display information, bank account information and the like. The user data may include name, contact information including address, email and phone number and payment account information for effecting a payment, and the like. A user computing device 12 and pay receipt device 16 may be coupled to the computer server 14, and, referring additionally to FIG. 13, the computer server 14 may be programmed to receive from the pay receipt device 16 a signal that the pay receipt device 16 is active and automatically generate and send for auto-execution instructions to establish a proximity zone 18 around the pay receipt device (Step 120); receive a signal from the pay receipt device 16 that a user computing device 12 of the system has entered the proximity zone 18 (Step 121); automatically establish a connection between the server and the user computing device in response to the user computing device entering the proximity zone 18 (Step 122); automatically generate and send for display on the user computing device 12 an order interface that includes at least one payment activation button (Step 123); receive from the user computing device a signal activating a payment, the signal including user identifying information, a payment amount and a payment instrument initiating the payment amount (Step 124); and automatically process the signal and send a communication to the user computing device to acknowledge receipt of the payment amount (Step 125).

The proximity zone 18 may be a predetermined size, such as a radius or space around the pay receipt device. The size of the proximity zone 18 may be determined by the type of pay receipt device and the charitable organization employing the pay receipt device. The proximity zone 18 may include, but is not limited to a geofence, an NFC zone, a Wi-Fi signal quadrant, such as a 5G Wi-Fi signal quadrant, or any other means of establishing a proximity zone.

The pay receipt device may include visual and/or audio alerts to signify a payment has been made (as shown in FIG. 12B). This may be a light and/or sound that will alert the user performing the payment that the pay receipt device 16 has received the payment information.

The computer server 14 may further be programmed to verify the charitable organization as legitimate and communicate the verification to the user computing device 12 in response to the user computing device accessing the system within the proximity zone 18. Further still, the computer server 14 may be programmed to verify or otherwise confirm that the pay receipt device 16 is legitimately associated with the charitable organization. In some embodiments, the computer server 14 is further programmed to automatically verify the charitable organization as legitimate and communicate the verification to the user computing device 12 in response to the user computing device 12 entering the proximity zone 18. A charitable organization may register with the system 10, and the system may verify the charitable organization as legitimate and store the verification in memory on the server. When the charitable organization operates the system, the server 14 may store in its memory an identification of one or more pay receipt devices 16 that is/are assigned to the charitable organization. Accordingly, the computer server 14 may be programmed to access its memory to determine or verify if the charitable organization associated with the pay receipt device(s) 16 is legitimate and to verify that the pay receipt device 16 is legitimately associated with the charitable organization, wherein the server 14 receives an identification of the pay receipt device(s) 16 when the device(s) 16 are activated and confirms that the identification of activated pay receipt device(s) 16 is assigned to the charitable organization. In at least this way, there is a two-step verification of verifying the charitable organization as legitimate and verifying that the pay receipt device 16 is associated or assigned to that legitimate charitable organization. It will be understood that in some embodiments, other organizations, such as, but not limited to, a business, a sole proprietor or the like may operate in a similar manner as described herein with regard to the charitable organization.

The computer server may then be programmed to transfer payments to a bank account of the charitable organization. The system may retain a predetermined amount from the total payment amount as a cost for processing the payments and for utilization of the system. This may be automated upon deactivation of the pay receipt device.

Figure 2:
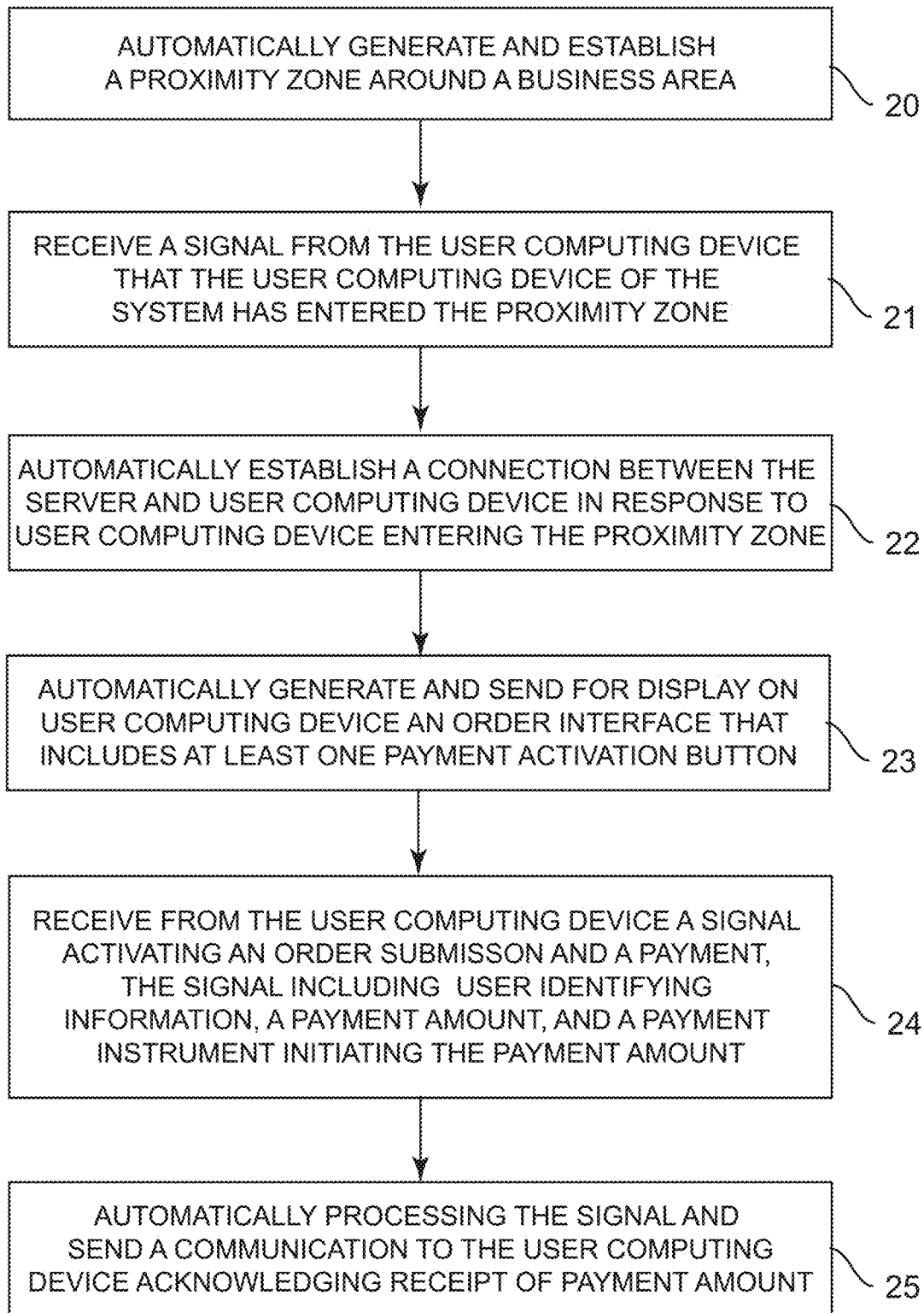
FIG. 2 is a flow chart of programmed steps of a computer server of a charity payment system in accordance with an embodiment.

In the drawings, FIGS. 3-11 depict various instances where the system 10 may be utilized. While is has been described above with regard to FIGS. 3-11 that the system 10 includes just a user computing device 12 and a server 14, it will be understood that the system may be configured to operate with a pay receipt device 16 as depicted in FIGS. 1-2. In these embodiments, the system 16 operating with regard to FIGS. 3-11 may include a pay receipt device 16 that is activated to establish a connection with the server 14, wherein the server sends instructions for the pay receipt device to establish the proximity zone 18 around each of the areas and/or each of the pay receipt devices 16 depicted in FIGS. 3-11.

Additionally, the computer server 14 may be programmed to automatically account for the payments made utilizing the system 10 by the same user through a user computing device 12. The computer server 14 may be programmed to automatically store in its memory, payment information associated with the user, wherein the payment information may include the charitable organization, the amount of the payment, and the date of the payment. The computer server 14 may be programmed to automatically generate tax documentation of all charitable payments made by the user over a calendar year itemized by charitable organization amount and dates of payments to be used by the user in preparing tax returns.

The pay receipt device 16 may further be programmed to verify the charitable organization as legitimate and communicate the verification to the user computing device in response to the user computing device accessing the system within the proximity zone 18. In some embodiments, the pay receipt device 16 is further programmed to automatically verify the charitable organization as legitimate and communicate the verification to the user computing device in response to the user computing device entering the proximity zone 18. A charitable organization may register with the system, and the system may verify the charitable organization as legitimate and store the verification in memory on the server. Accordingly, the computer server may be programmed to access its memory to determine if the charitable organization associated with the pay receipt device is legitimate.

It should be appreciated that the system 10 operates in a manner that keeps the user information anonymous from the charities or organizations that utilize the system 10. The system 10 may be operated by a third party, wherein charities or businesses register for use of the system 10 and the information of the charities or businesses are stored on the system. The charities may then operate an application on a tablet, smartphone or other computing device operating as a pay receipt device 16. The activation of the application associates the pay receipt device 16 and the login information for operating the application can serve as part of the verification process described previously. As a user with user computing device 12 may move from proximity zone to proximity zone and the system 10 can send the alert to the user computing device 12 in a one directional push of information to the user computing device 12, either to the device itself or through the application operating the system. This does not need to include the sharing of user information with charity or business or tracking of location by the charity or business. In some embodiments, the system 10 may not ever need to share the user's information with the charity or business and the user can still receive the tax benefit based on documentation provided from the system 10. The system operating in at least this way provides places the movement from anonymous to engaging with the charity in the hands of the user and not a byproduct of utilizing the system.

Embodiments may be available on or through the internet, such as through domain names reserved and owned by Applicant that include gpspays.com, gpspaid.com, charityzone.com, givinginstantly.com, farmtocash.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A payment system comprising:
   a computer server having a memory storing business data of a business and user data of a user;
   a pay receipt device coupled to the computer server; and
   a user computing device coupled to the computer server separate from the coupling of the pay receipt device, the computer server programmed to:
   automatically generate and establish a proximity zone around the pay receipt device in a business area;
   receive a first signal from the user computing device that the user computing device of the system has entered the proximity zone;

automatically establish a direct connection between the server and the user computing device separate from the coupling of the pay receipt device with the computer server in response to the user computing device entering the proximity zone;

receive from the user computing device through the established direct connection between the server and the user computing device a second signal activating an order submission and a payment in response to selection of the at least one payment activation button on the user computing device, the second signal comprising user identifying information, payment amount and payment instrument initiating the payment amount; and automatically process the second signal and send a communication to the user computing device through the established direct connection between the server and the user computing device to acknowledge receipt of the payment amount.

2. The system of claim 1, wherein the at least one payment activation button comprises the payment amount associated with items in the order submission.

3. The system of claim 1, wherein the server is further programmed to send verification instructions to the user computing device in response to receiving and processing the order submission and the payment amount.

4. The system of claim 1, wherein the computer server is further programmed to automatically account for the payment made utilizing the system by the user.

5. The system of claim 1, wherein the computer server is programmed with artificial intelligence to verify if the business associated with the proximity zone is legitimate and to verify that the proximity zone is legitimately associated with the business.

\* \* \* \* \*